(12) United States Patent
Posamentier et al.

(10) Patent No.: US 8,843,353 B2
(45) Date of Patent: Sep. 23, 2014

(54) HYBRID DETERMINISTIC-GEOSTATISTICAL EARTH MODEL

(75) Inventors: Henry W. Posamentier, The Woodlands, TX (US); Cung Khac Vu, Houston, TX (US); James P. DiSiena, Houston, TX (US); Todd Dygert, Kingwood, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 131 days.

(21) Appl. No.: 13/217,810

(22) Filed: Aug. 25, 2011

(65) Prior Publication Data

US 2013/0054201 A1 Feb. 28, 2013

(51) Int. Cl.
*G06F 7/60* (2006.01)
*G01V 99/00* (2009.01)

(52) U.S. Cl.
CPC ........ *G01V 99/005* (2013.01); *G01V 2210/665* (2013.01)
USPC .............................................. 703/2; 382/109

(58) Field of Classification Search
CPC . G01V 11/00; G01V 2210/66; G01V 99/005; G01V 1/30; G01V 2210/661; G01V 2210/665; G01V 99/00; G01V 3/20
USPC .......................... 703/2, 5, 10; 702/181; 367/67
See application file for complete search history.

(56) References Cited

U.S. PATENT DOCUMENTS

| | | | |
|---|---|---|---|
| 6,754,588 B2 * | 6/2004 | Cross et al. ...................... 702/11 |
| 6,771,800 B2 * | 8/2004 | Keskes et al. ................. 382/109 |
| 7,024,021 B2 * | 4/2006 | Dunn et al. ..................... 382/109 |
| 7,089,166 B2 * | 8/2006 | Malthe-Sorenssen et al. . 703/10 |
| 7,257,488 B2 * | 8/2007 | Cacas ............................... 702/2 |
| 2003/0182093 A1 * | 9/2003 | Jones et al. ...................... 703/11 |
| 2009/0043545 A1 * | 2/2009 | van Manen et al. .............. 703/2 |
| 2010/0185422 A1 * | 7/2010 | Hoversten .......................... 703/2 |
| 2011/0048731 A1 * | 3/2011 | Imhof et al. ................... 166/369 |
| 2011/0205846 A1 * | 8/2011 | Wang .............................. 367/63 |

OTHER PUBLICATIONS

Posamentier et al. ("Seismic geomorphology—an overview", The Geological Society of London, 2007, pp. 1-14).*
Finarelli et al. ("Comparing the Gap Excess Ratio and the Retention Index of the Stratigraphic Character", Syst. Biol. 51(1):166-176, 2002).*
Toxopeus et al. ("Simulating migrated seismic data by filtering an earth model: A MATLAB implementation", Computers & Geosciences 36 (2010) 195-204).*
U.S. Appl. No. 13/017,995, Posamentier et al., Jan. 31, 2011.
U.S. Appl. No. 13/018,094, Posamentier et al., Jan. 31, 2011.

* cited by examiner

*Primary Examiner* — Omar Fernandez Rivas
*Assistant Examiner* — Iftekhar Khan
(74) *Attorney, Agent, or Firm* — Marie L. Clapp

(57) ABSTRACT

Embodiments of the present technology integrate seismic data and geologic concepts into earth model building. More specifically, exemplary embodiments provide new ways to build an earth model based on information in the seismic data and geologic concepts to use as a context to interpret the seismic data and/or to add to the earth model in regions where the seismic data is missing (e.g., either no data or no data resolvability). In some embodiments, a deterministic framework is generated for an earth models through deterministic identification of discrete geobodies. A hybrid deterministic-geostatistical earth model is generated by filling stratigraphic gaps in a deterministic framework using geostatistical information and/or seismic inversion, in accordance with some embodiments.

25 Claims, 6 Drawing Sheets

HYBRID DETERMINISTIC-GEOSTATISTICAL EARTH MODEL

FIELD OF THE DISCLOSURE

This disclosure generally relates to modeling a geologic volume of interest and, more specifically, to generating a hybrid deterministic-geostatistical earth model.

BACKGROUND OF THE DISCLOSURE

Seismic imaging and subsurface interpretation are performed to obtain, as accurately as possible, a geologic model of a subsurface volume of the earth. Conventional industry workflows generally include the following serial process steps: (a) process the seismic data into 3D seismic image volumes of the subsurface volume of the earth; (b) extract attributes (e.g., velocity, Poisson's ratio, density, acoustic impedance, etc.) at each subsurface point in the subsurface volume of the earth using tabulated and other known petrophysical data and rock properties; (c) interpret the geometry of the 3D seismic image volumes, log information, and geological analogs on an interpretation workstation to obtain the structure, stratigraphic, and geologic morphology; and (d) construct a geological and reservoir subsurface model from extracted attributes and the obtained structure, stratigraphic, and geologic morphology.

Conventional industry workflows have limited reconciliation/integration of earth models used in imaging with interpretation of structure and stratigraphy, and with reservoir properties from seismic estimation. Each process step has inherent uncertainties and non-uniqueness that cannot be well defined quantitatively. Consequently, it is difficult to quantify the uncertainties and non-uniqueness of geological reservoir models yielded by conventional industry workflows. Most industry workflows resort to geostatistical methods to estimate uncertainties and non-uniqueness. Even so, there is no guarantee that the resulting, probabilistic models are consistent with all the data utilized in generating the models.

SUMMARY

One aspect of the disclosure relates to a computer-implemented method for generating a deterministic framework for earth models through deterministic identification of discrete geobodies. The method includes obtaining a plurality of image volumes associated with an earth model of a geologic volume of interest that includes one or more geobodies. The earth model is based on seismic data representing energy that has propagated through the geologic volume of interest from one or more energy sources to one or more energy receivers. The seismic data includes one or more of at least one offset stack, at least one angle stack, or at least one azimuth stack. Individual ones of the plurality of image volumes correspond to different stack domains. The method includes performing one or both of signal processing enhancements or spectral decomposition on one or more frequency ranges on the plurality of image volumes associated with the earth model of the geologic volume of interest. The method includes identifying one or more discrete geobody representations in individual ones of the plurality of image volumes by analyzing one or more of the plurality of image volumes using one or both of a seismic stratigraphic analytical technique or a seismic geomorphologic analytical technique. Individual ones of the one or more geobody representations correspond to the one or more geobodies included in the geologic volume of interest. The method includes assigning facies distributions to individual ones of the plurality of image volumes. The facies distributions include spatially descriptive values and/or rock properties assigned to the identified one or more geobody representations based on one or both of borehole data and/or geophysical modeling. The method includes generating a deterministic framework of the earth model based on an aggregation of the facies distributions. The deterministic framework is a matrix associated with the earth model that extends over some or the entire earth model and includes individual ones of the identified one or more geobody representations and one or more undefined regions. The method includes identifying one or more stratigraphic gaps in the deterministic framework of the earth model. The one or more stratigraphic gaps are devoid of identified geobody representations.

Another aspect of the disclosure relates to a computer-implemented method for generating hybrid deterministic-geostatistical earth models by filling stratigraphic gaps in deterministic frameworks using geostatistical information and/or seismic inversion. The method includes obtaining a deterministic framework associated with an earth model of a geologic volume of interest that includes one or more geobodies. The earth model is based on measured seismic data representing energy that has propagated through the geologic volume of interest from one or more energy sources to one or more energy receivers. The measured seismic data includes one or more of at least one offset stack, at least one angle stack, or at least one azimuth stack. The deterministic framework is a matrix associated with the earth model that extends over some or the entire earth model. The method includes identifying a set of one or more geobody representations associated with the geologic volume of interest. Individual ones of the geobody representations in the set are stochastically derived and represent individual ones of the one or more geobodies included in the geologic volume of interest. The set of one or more geobody representations is constructed based on geostatistical methodology using one or both of borehole data or interpreted dynamic production data. The method includes generating an initial hybrid deterministic-geostatistical earth model by filling one or more stratigraphic gaps in the deterministic framework of the earth model with individual ones of the geobody representations in the set. Individual ones of the one or more stratigraphic gaps are regions of the deterministic framework that are devoid of geobody representations. The method includes generating a synthetic seismic response of the initial hybrid deterministic-geostatistical earth model for comparison with the measured seismic data. The comparison facilitates validation of the initial hybrid deterministic-geostatistical earth model. The method includes iteratively refining the initial hybrid deterministic-geostatistical earth model to obtain a set of final hybrid deterministic-geostatistical earth models. The refining is based on successive comparisons between the geologic seismic response and synthetic seismic responses of refined hybrid deterministic-geostatistical earth models. A synthetic seismic response of individual ones of the set of final hybrid deterministic-geostatistical earth model approximates the measured seismic data. The method includes selecting a representative hybrid deterministic-geostatistical earth model from among the set of final hybrid deterministic-geostatistical earth models. The representative hybrid deterministic-geostatistical earth model has a range of uncertainties based on one or more of at least one reservoir parameter or geological plausibility.

Yet another aspect of the disclosure relates to a system configured to generate a deterministic framework for earth models and to generate hybrid deterministic-geostatistical earth models. The system includes one or more processors configured to execute computer program modules. The computer program modules include an image volume module, a geobody module, a facies assignment module, a framework module, a hybrid model module, and a synthetic seismic response module. The image volume module is configured to generate or obtain a plurality of image volumes associated with an earth model of a geologic volume of interest that includes one or more geobodies. The earth model is based on seismic data representing energy that has propagated through the geologic volume of interest from one or more energy sources to one or more energy receivers. The seismic data includes one or more of at least one offset stack, at least one angle stack, or at least one azimuth stack. Individual ones of the plurality of image volumes correspond to different stack domains. The geobody module is configured to identify one or more discrete geobody representations in individual ones of the plurality of image volumes by analyzing one or more of the plurality of image volumes using one or both of a seismic stratigraphic analytical technique or a seismic geomorphologic analytical technique. Individual ones of the one or more geobody representations correspond to the one or more geobodies included in the geologic volume of interest. The facies assignment module is configured to assign facies distributions to individual ones of the plurality of image volumes. The facies distributions include spatially descriptive values and/or rock properties assigned to the identified one or more geobody representations based on one or both of borehole data and/or geophysical modeling. The framework module is configured to generate or obtain a deterministic framework of the earth model based on an aggregation of the facies distributions. The deterministic framework is a matrix associated with the earth model that extends over some or all of the earth model and including individual ones of the identified one or more geobody representations and one or more stratigraphic gaps. Individual ones of the one or more stratigraphic gaps are regions of the deterministic framework that are devoid of geobody representations. The hybrid model module is configured to generate or obtain a hybrid deterministic-geostatistical earth model by filling individual ones of the one or more stratigraphic gaps in the deterministic framework with individual ones of a set of one or more geobody representations associated with the geologic volume of interest. Individual ones of the geobody representations in the set are stochastically derived and represent individual ones of the one or more geobodies included in the geologic volume of interest. The set of one or more geobody representations is constructed based on geostatistical methodology using one or both of borehole data or interpreted dynamic production data. The synthetic seismic response module is configured to generate or obtain a synthetic seismic response of the hybrid deterministic-geostatistical earth model for comparison with the seismic data to validate the hybrid deterministic-geostatistical earth model.

Still another aspect of the disclosure relates to a computer-readable storage medium having instructions embodied thereon. The instructions are executable by a processor to perform a method for generating a deterministic framework for earth models through deterministic identification of discrete geobodies. The method includes obtaining a plurality of image volumes associated with an earth model of a geologic volume of interest that includes one or more geobodies. The earth model is based on seismic data representing energy that has propagated through the geologic volume of interest from one or more energy sources to one or more energy receivers. The seismic data includes one or more of at least one offset stack, at least one angle stack, or at least one azimuth stack. Individual ones of the plurality of image volumes correspond to different stack domains. The method includes performing one or both of signal processing enhancements or spectral decomposition on one or more frequency ranges on the plurality of image volumes associated with the earth model of the geologic volume of interest. The method includes identifying one or more discrete geobody representations in individual ones of the plurality of image volumes by analyzing one or more of the plurality of image volumes using one or both of a seismic stratigraphic analytical technique or a seismic geomorphologic analytical technique. Individual ones of the one or more geobody representations correspond to the one or more geobodies included in the geologic volume of interest. The method includes assigning facies distributions to individual ones of the plurality of image volumes. The facies distributions include spatially descriptive values and/or rock properties assigned to the identified one or more geobody representations based on one or both of borehole data and/or geophysical modeling. The method includes generating a deterministic framework of the earth model based on an aggregation of the facies distributions. The deterministic framework is a matrix associated with the earth model that extends over some or the entire earth model and includes individual ones of the identified one or more geobody representations and one or more undefined regions. The method includes identifying one or more stratigraphic gaps in the deterministic framework of the earth model. The one or more stratigraphic gaps are devoid of identified geobody representations.

A further aspect of the disclosure relates to a computer-readable storage medium having instructions embodied thereon. The instructions are executable by a processor to perform a method for generating hybrid deterministic-geostatistical earth models by filling stratigraphic gaps in deterministic frameworks using geostatistical information and/or seismic inversion. The method includes obtaining a deterministic framework associated with an earth model of a geologic volume of interest that includes one or more geobodies. The earth model is based on measured seismic data representing energy that has propagated through the geologic volume of interest from one or more energy sources to one or more energy receivers. The measured seismic data includes one or more of at least one offset stack, at least one angle stack, or at least one azimuth stack. The deterministic framework is a matrix associated with the earth model that extends over some or the entire earth model. The method includes identifying a set of one or more geobody representations associated with the geologic volume of interest. Individual ones of the geobody representations in the set are stochastically derived and represent individual ones of the one or more geobodies included in the geologic volume of interest. The set of one or more geobody representations is constructed based on geostatistical methodology using one or both of borehole data or interpreted dynamic production data. The method includes generating an initial hybrid deterministic-geostatistical earth model by filling one or more stratigraphic gaps in the deterministic framework of the earth model with individual ones of the geobody representations in the set. Individual ones of the one or more stratigraphic gaps are regions of the deterministic framework that are devoid of geobody representations. The method includes generating a synthetic seismic response of the initial hybrid deterministic-geostatistical earth model for comparison with the measured seismic data. The comparison facilitates validation of the initial hybrid deterministic-geostatistical earth model. The method includes iteratively refining the initial hybrid deterministic-geostatistical earth model to obtain a set of final hybrid deterministic-geostatistical earth models. The refining is based on successive comparisons between the geologic seismic response and synthetic seismic responses of refined hybrid deterministic-geostatistical earth models. A synthetic seismic response of individual ones of the set of final hybrid deterministic-geostatistical earth model approximates the measured seismic data. The method includes selecting a representative hybrid deterministic-geostatistical earth model from among the set of final hybrid deterministic-geostatistical earth models. The representative hybrid deterministic-geostatistical earth model has a range of uncertainties based on one or more of at least one reservoir parameter or geological plausibility.

These and other features and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the technology. As used in the specification and in the claims, the singular form of "a", "an", and "the" include plural referents unless the context clearly dictates otherwise.

DETAILED DESCRIPTION

Figure 1:
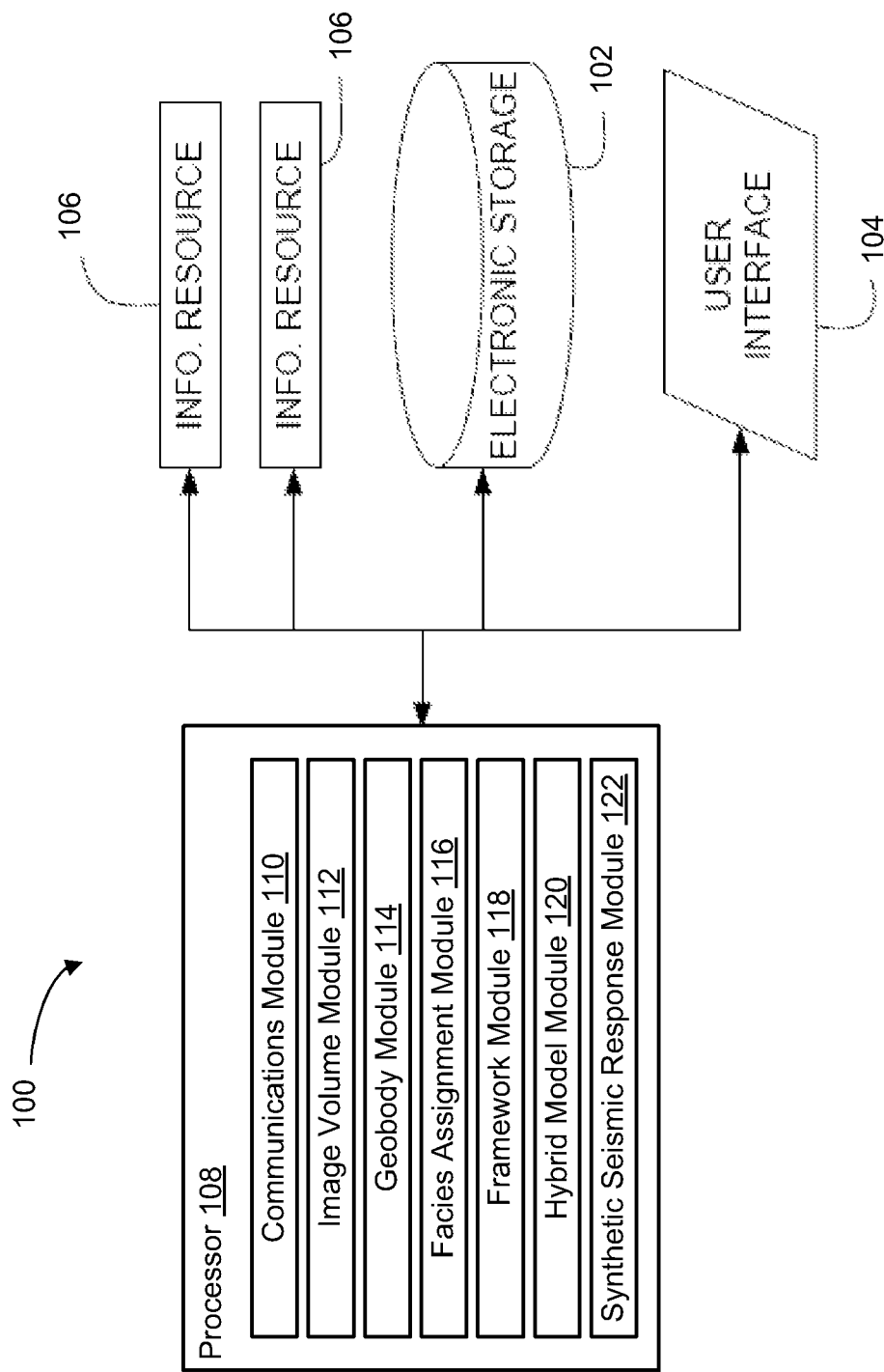
FIG. 1 illustrates a system configured to generate a deterministic framework for earth models and to generate hybrid deterministic-geostatistical earth models, in accordance with one or more embodiments.

The present technology may be described and implemented in the general context of a system and computer methods to be executed by a computer. Such computer-executable instructions may include programs, routines, objects, components, data structures, and computer software technologies that can be used to perform particular tasks and process abstract data types. Software implementations of the present technology may be coded in different languages for application in a variety of computing platforms and environments. It will be appreciated that the scope and underlying principles of the present technology are not limited to any particular computer software technology.

Moreover, those skilled in the art will appreciate that the present technology may be practiced using any one or combination of hardware and software configurations, including but not limited to a system having single and/or multi-processer computer processors system, hand-held devices, programmable consumer electronics, mini-computers, mainframe computers, and the like. The technology may also be practiced in distributed computing environments where tasks are performed by servers or other processing devices that are linked through one or more data communications networks. In a distributed computing environment, program modules may be located in both local and remote computer storage media including memory storage devices.

Also, an article of manufacture for use with a computer processor, such as a CD, pre-recorded disk or other equivalent devices, may include a computer program storage medium and program means recorded thereon for directing the computer processor to facilitate the implementation and practice of the present technology. Such devices and articles of manufacture also fall within the spirit and scope of the present technology.

Referring now to the drawings, embodiments of the present technology will be described. The technology can be implemented in numerous ways, including for example as a system (including a computer processing system), a method (including a computer implemented method), an apparatus, a computer-readable storage medium, a computer program product, a graphical user interface, a web portal, or a data structure tangibly fixed in a computer-readable memory. Several embodiments of the present technology are discussed below. The appended drawings illustrate only typical embodiments of the present technology and therefore are not to be considered limiting of its scope and breadth.

FIG. 1 illustrates a system 100 configured to generate a deterministic framework for earth models and to generate hybrid deterministic-geostatistical earth models, in accordance with one or more embodiments. Embodiments of the present technology integrate seismic data and geologic concepts into earth model building. More specifically, exemplary embodiments provide new ways to build an earth model based on information in the seismic data and geologic concepts to use as a context to interpret the seismic data and/or to add to the earth model in regions where the seismic data is missing (e.g., either no data or no data resolvability). As depicted in FIG. 1, system 100 may include electronic storage 102, a user interface 104, one or more information resources 106, at least one processor 108, and/or other components.

In some embodiments, electronic storage 102 comprises electronic storage media that electronically stores information. The electronic storage media of electronic storage 102 may include system storage that is provided integrally (i.e., substantially non-removable) with system 100 and/or removable storage that is removably connectable to system 100 via, for example, a port (e.g., a USB port, a firewire port, etc.) or a drive (e.g., a disk drive, etc.). Electronic storage 102 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 102 may store software algorithms, information determined by processor 108, information received via user interface 104, information received from information resources 106, and/or other information that enables system 100 to function as described herein. Electronic storage 102 may be a separate component within system 100, or electronic storage 102 may be provided integrally with one or more other components of system 100 (e.g., processor 108).

User interface 104 is configured to provide an interface between system 100 and a user through which the user may provide information to and receive information from system 100. This enables data, results, and/or instructions and any other communicable items, collectively referred to as "information," to be communicated between the user and system 100. As used herein, the term "user" may refer to a single individual or a group of individuals who may be working in coordination. Examples of interface devices suitable for inclusion in user interface 104 include one or more of a keypad, buttons, switches, a keyboard, knobs, levers, a display screen, a touch screen, speakers, a microphone, an indicator light, an audible alarm, and/or a printer. In one embodiment, user interface 104 actually includes a plurality of separate interfaces.

It is to be understood that other communication techniques, either hard-wired or wireless, are also contemplated by the present technology as user interface 104. For example, the present technology contemplates that user interface 104 may be integrated with a removable storage interface provided by electronic storage 102. In this example, information may be loaded into system 100 from removable storage (e.g., a smart card, a flash drive, a removable disk, etc.) that enables the user to customize the implementation of system 100. Other exemplary input devices and techniques adapted for use with system 100 as user interface 104 include, but are not limited to, an RS-232 port, RF link, an IR link, modem (telephone, cable or other). In short, any technique for communicating information with system 100 is contemplated by the present technology as user interface 104.

Information resources 106 include one or more sources of information related to the geologic volume of interest. By way of non-limiting example, one of information resources 106 may include seismic data acquired at or near the geological volume of interest, information derived therefrom, and/or information related to the acquisition. Such seismic data may include source wave fields and receiver wave fields. The seismic data may include individual traces of seismic data (e.g., the data recorded on one channel of seismic energy propagating through the geological volume of interest from a source), offset stacks, angle stacks, azimuth stacks, and/or other data. The information derived from the seismic data may include, for example, geologic models from seismic data representing energy that has propagated through the geologic volume of interest from one or more energy sources to one or more energy receivers, image volumes from the geologic model representing geobodies present in the geologic volume of interest, and/or other information. Individual ones of the image volumes may correspond to individual ones of the offset stacks, angle stacks, or azimuth stacks. Information related to the acquisition of seismic data may include, for example, data related to the position and/or orientation of a source of seismic energy, the positions and/or orientations of one or more detectors of seismic energy, the time at which energy was generated by the source and directed into the geological volume of interest, and/or other information.

Information resources 106 may include information other than seismic-related data associated with the geologic volume of interest. Examples of such information may include information relating to gravity, magnetic fields, resistivity, magnetotelluric information, radar data, well logs, rock properties, geological analog data, and/or other information.

Processor 108 is configured to provide information processing capabilities in system 100. As such, processor 108 may include one or more of a digital processor, an analog processor, a digital circuit designed to process information, an analog circuit designed to process information, a state machine, and/or other mechanisms for electronically processing information. Although processor 108 is shown in FIG. 1 as a single entity, this is for illustrative purposes only. In some implementations, processor 108 may include a plurality of processing units. These processing units may be physically located within the same device or computing platform, or processor 108 may represent processing functionality of a plurality of devices operating in coordination.

As is shown in FIG. 1, processor 108 may be configured to execute one or more computer program modules. The one or more computer program modules may include one or more of a communications module 110, an image volume module 112, a geobody module 114, a facies assignment module 116, a framework module 118, a hybrid model module 120, a synthetic seismic response module 122, and/or other modules. Processor 108 may be configured to execute modules 110, 112, 114, 116, 118, 120, and/or 122 by software; hardware; firmware; some combination of software, hardware, and/or firmware; and/or other mechanisms for configuring processing capabilities on processor 108.

It should be appreciated that although the modules 110, 112, 114, 116, 118, 120, and 122 are illustrated in FIG. 1 as being co-located within a single processing unit, in implementations in which processor 108 includes multiple processing units, one or more of the modules 110, 112, 114, 116, 118, 120, and/or 122 may be located remotely from the other modules. The description of the functionality provided by the different modules 110, 112, 114, 116, 118, 120, and/or 122 described below is for illustrative purposes, and is not intended to be limiting, as any of the modules 110, 112, 114, 116, 118, 120, and/or 122 may provide more or less functionality than is described. For example, one or more of the modules 110, 112, 114, 116, 118, 120, and/or 122 may be eliminated, and some or all of its functionality may be provided by other ones of the modules 110, 112, 114, 116, 118, 120, and/or 122. As another example, processor 108 may be configured to execute one or more additional modules that may perform some or all of the functionality attributed below to one of the modules 110, 112, 114, 116, 118, 120, and/or 122. As yet another example, processor 108 may be configured to execute one or more modules that may perform some or all of the functionality attributed to one or more modules described in co-pending U.S. patent application Ser. No. 13/017,995 ("the '995 application"), filed Jan. 31, 2011, and entitled "Extracting Geologic Information from Multiple Offset Stacks and/or Angle Stacks;" and/or in co-pending U.S. patent application Ser. No. 13/018,094 ("the '094 application"), filed Jan. 31, 2011, and entitled "Exploitation of Self-Consistency and Differences Between Volume Images and Interpreted Spatial/Volumetric Context," which are both incorporated herein by reference.

Communications module 110 may be configured to receive information. Such information may be received from information resources 106, the user via user interface 104, electronic storage 102, and/or other information sources. Examples of received information may include seismic data and information derived therefrom, information related to the acquisition of seismic data, offset stacks, angle stacks, azimuth stacks, geologic models, image volumes, and/or other information. Information received by communications module 110 may be utilized by one or more of modules 112, 114, 116, 118, 120, and/or 122. Examples of some such utilizations are described below. The communication module 110 may be configured to transmit information to one or more other components of system 100.

Image volume module 112 may be configured to generate or otherwise obtain one or more image volumes associated with an earth model of a geologic volume of interest. Image volumes and earth models are described further below. A geologic volume of interest is a subterranean region, which may include one or more geobodies. Examples of geobodies may include one or more of a stratigraphic horizon, a reservoir surface, a geological surface, a fluvial channel, a delta, a deltaic fan, a submarine fan, a reef, a sandbar, a point bar, a fault, an unconformity, a dike, a sill, a salt body, a crevasse splay, a reservoir flow unit, a fluid contact, a turbidite channel, a turbidite sheet, and/or other subterranean bodies.

A geologic volume of interest may include one or more "overburdens." An overburden may generally be described as a geologic section above a bed, refractor, and/or reflector. Examples of an overburden may include material lying above an ore or valuable deposit and pressing down on it, loose unconsolidated material above bedrock, and/or other overburdens. An overburden may be associated with a velocity model and/or other model that can be used for re-imaging.

A geologic volume of interest may include one or more targets such as, for example, reservoir targets. Detailed analysis may be performed on such targets to determine information relating to geobodies and/or rock properties (described further herein), in accordance with one or more embodiments. Depending on the specific information sought, a geologic volume of interest may include an entire geologic section from the surface to the target interval over an area of interest, or a geologic volume of interest may be confined to a specific target interval.

An earth model may be based on seismic data representing energy that has propagated through the geologic volume of interest from one or more energy sources to one or more energy receivers. The seismic data may include one or more of at least one offset stack, at least one angle stack, or at least one azimuth stack. Individual image volumes may correspond to different stack domains.

According to some embodiments, an earth model may be single- or multi-dimensional. Examples of such models may include a velocity model and/or other models associated with a geologic volume of interest. An earth model may include a numerical representation of at least one property (e.g., seismic velocity, density, attenuation, anisotropy, and/or other property) as a function of location within the geologic volume of interest. A velocity model may include a spatial distribution of velocity through which ray-paths obeying Snell's law can be traced. A velocity model may refer to a model used in migration such as, for example, depth migration. A velocity model may be referred to as a velocity cube.

In general, image volumes are two- or three-dimensional visual representations of one or more aspects of a geologic model. An individual image volume may correspond to individual offset stacks; angle stacks; azimuth stacks; transforms of offset stacks, angle stacks, and/or azimuth stacks (e.g., spectral decomposition and/or other transforms); and/or other information. Image volumes may represent geobodies present in the geologic volume of interest.

An image volume may be descriptive of a spatial distribution and/or temporal distribution within the geologic volume of interest of one or more attributes. Attributes may include, for example, one or more of velocity, coherence, Hilbert transform, amplitude, instantaneous frequency, spectral decomposition, anisotropy, attenuation, impedance, density, Poisson's ratio, acoustic properties, elastic properties, petrophysical properties, rock properties, fluid properties, reservoir properties, seismic response, geologic description, lithologic classification, dip, magnitude, curvature, roughness, dip azimuth, spectral shape, and/or other information attributable to geologic volumes and/or geobodies. According to some embodiments, generating and/or obtaining an image volume may include utilizing one or more of borehole-derived information, seismic data used to obtain the geologic model, and/or other information.

An image volume may be generated and/or obtained based on spatially aligned geologically consistent volumes associated with the geologic volume of interest. An image volume may be formed from a plurality of offset stacks, azimuth stacks, and/or angle stacks that represent energy that has propagated through the geologic volume of interest from one or more energy sources to one or more energy receivers. A plurality of image volumes associated with individual source-receiver offsets and/or source-receiver angles may be determined based on corresponding offset stacks, azimuth stacks, and/or angle stacks.

Image volume module 112 may be configured to obtain one or more slices through an image volume. Slices through the image volume may be arranged as a logical sequence of slices. The slices may include common-time slices, common-depth slices, common-slope slices, common-vertical slices, common-horizon slices, and/or other slices. Prior to obtaining the slices, according to some embodiments, image volume module 112 may flatten the image volume according to time, depth, slope, vertical, horizon, dip, dip azimuth, an interpreted horizon, and/or other metric.

Image volume module 112 may be configured to generate one or more optical stack volumes. An individual optical stack volume may include two or more slices. As such, a given optical stack volume may correspond to a thickness range of an attribute volume from which the slices were obtained. According to some embodiments, slices may be viewed from one or more directions by a user and may be stacked based on visual inspection by a user to yield optical stack volumes. In some embodiments, slices may be stacked automatically to yield optical stack volumes. Opacity and/or transparency of one or more slices included in the given optical stack volume may be adjusted. In some embodiments, opacity and/or transparency criteria associated with individual slices and/or groups of slices may be based on user input or determined automatically. Modifying opacity of individual slices included in the given optical stack volume may emphasize one or more geologic features included in the corresponding thickness range of the attribute volume from which the slices were obtained. For example, opacity and/or transparency may be adjusted such that geobodies breach an opacity threshold.

Image volume module 112 may be configured to segment an image volume. Segmentation may reduce computational costs. Such segmentation may be performed according to geologic features represented in the image volume and/or other subdivision of the image volume. That is, a given segment may correspond to one or more geologic features, or a given segment may correspond to some other subdivision of the image volume. A segment of an image volume may be processed similar to the processing of image volumes described herein. For example, image volume module 112 may be configured to obtain one or more slices through a segment of an image volume.

In some embodiments, image volume module 112 is configured to perform one or both of signal processing enhancements or spectral decomposition on one or more frequency ranges on individual ones of a plurality of image volumes associated with the earth model of the geologic volume of interest. Image volume module 112 may be configured to cancel out noise-related patterns by filtering one or more of individual ones of the plurality of image volumes, slices through individual ones of the plurality of image volumes, or optical stack volumes associated with individual ones of the plurality of image volumes.

Geobody module 114 may be configured to identify one or more discrete geobody representations in one or more image volumes. This may be done by analyzing one or more image volumes using one or more of a seismic stratigraphic analytical technique, a seismic geomorphologic analytical technique, and/or other techniques. Individual ones of the one or more geobody representations correspond to the one or more geobodies included in the geologic volume of interest. Individual ones of the geobody representations may be stochastically derived. The one or more geobody representations may form a set of geobody representations constructed based on geostatistical methodology using one or more of borehole data, interpreted dynamic production data, and/or other information.

In accordance with some embodiments, geobody module 114 may be configured to identify the one or more discrete geobody representations by identifying one or more stratigraphic patterns in a given image volume based on an animation. Such an animation may comprise a succession of frames derived from the given image volume. An individual frame may include a single slice through the given image volume or an optical stack volume associated with the given image volume. In some embodiments, identifying the one or more stratigraphic patterns in the given image volume may include interpreting the given image volume based on analysis of slices through the given image volume or optical stack volumes associated with the given image volume. Identifying the one or more stratigraphic patterns from the animation may include identifying changes between successive frames of the animation. Such changes between the successive frames of the animation may include geobodies having different rates of movement between the successive frames.

Facies assignment module 116 may be configured to assign facies distributions to individual ones of the plurality of image volumes. The facies distributions include spatially descriptive values and/or rock properties assigned to the identified one or more geobody representations based on one or more of borehole data, geophysical modeling, and/or other information associated with facies distributions. The spatially descriptive values include one or more of a vertical thickness value, a lateral dimension value, and/or other spatially descriptive values. The spatially descriptive values may be determined via reservoir property estimation from seismic analysis, in some embodiments. Examples of rock properties include one or more of velocity, porosity, permeability, homogeneity, anisotropy, density, acoustic properties, elastic properties, petrophysical properties, fluid properties, reservoir properties, geologic description, lithologic classification, and/or other properties associated with geobodies.

Facies assignment module 116, according to some embodiments, may be configured assign an interpretation confidence level to individual ones of the identified one or more geobody representations. An interpretation confidence level for a given geobody representation may be indicative of confidence in spatially descriptive values and/or rock properties associated with the given geobody representation. The assignment of confidence levels may be performed automatically and/or based on user input received via user interface 104 and/or other components of system 100.

Framework module 118 may be configured to generate and/or otherwise obtain a deterministic framework associated with an earth model of a geologic volume of interest. In some embodiments, framework module 118 may be configured to generate and/or otherwise obtain the deterministic framework based on an aggregation of the facies distributions. The deterministic framework is a matrix associated with the earth model that extends over some or the entire earth model. The deterministic framework includes one or more geobody representations included in the earth model. The deterministic framework may include one or more undefined and/or underdefined regions. Such regions may be considered stratigraphic gaps in the deterministic framework that are devoid of identified geobody representations. Framework module 118 may be configured to identify one or more stratigraphic gaps in the deterministic framework of the earth model.

Hybrid model module 120 may be configured to generate an initial hybrid deterministic-geostatistical earth model. This may be performed by filling one or more stratigraphic gaps in the deterministic framework of the earth model with one or more geobody representations identified in conjunction with geobody module 114. According to some embodiments, filling at least one of the one or more stratigraphic gaps in the deterministic framework is based on a multi-point statistical (MPS) workflow. One or more exemplary MPS workflows are described in U.S. patent application Ser. No. 10/923,316, filed Aug. 20, 2004, and entitled "Method for Making a Reservoir Facies Model Utilizing a Training Image and a Geologically Interpreted Facies Probability Cube," which is incorporated herein by reference. Generating the initial hybrid deterministic-geostatistical earth model may include assigning one or more of spatially descriptive values, rock properties, and/or other information to individual ones of the geobody representations included in the hybrid deterministic-geostatistical earth model. This may be based on one or more of borehole data, geophysical modeling, and/or other information associated with the geologic volume of interest.

Hybrid model module 120 may be configured to perform an inversion to generate the initial and/or other hybrid deterministic-geostatistical earth models. Performing an inversion may include deriving from data (e.g., seismic data, field data, and/or other data) a model to describe the subsurface of a geologic volume of interest that is consistent with the data. An inversion may include solving for a spatial distribution of parameters which could have produced an observed set of measurements. Examples of such parameters may include registration data, seismic event times, and/or other parameters.

Synthetic seismic response module 122 may be configured to generate and/or otherwise obtain synthetic seismic response. The synthetic seismic response may correspond to a hybrid deterministic-geostatistical earth model and/or other model. The synthetic seismic response may include a computer generated seismic reflection record generated by assuming that a particular waveform travels through an assumed model. The synthetic seismic response may not be restricted by dimensionality of a corresponding model. The synthetic seismic response may include propagation through a single- or multi-dimensional elastic model with attenuation and velocity anisotropy. In exemplary embodiments, the synthetic seismic response of the initial and/or other hybrid deterministic-geostatistical earth models is generated for comparison with the measured seismic data. Such comparison facilitates validation of the initial and/or other hybrid deterministic-geostatistical earth models.

Returning to hybrid model module 120, this module may be configured to iteratively refine the initial hybrid deterministic-geostatistical earth model to obtain a set of final hybrid deterministic-geostatistical earth models. The refining may be based on successive comparisons between the geologic seismic response and synthetic seismic responses of refined hybrid deterministic-geostatistical earth models. A synthetic seismic response of individual ones of the set of final hybrid deterministic-geostatistical earth models approximates the measured seismic data. In some embodiments, iterative reworking between one or more of modules 110, 112, 114, 116, 118, 120, and/or 122 may be performed.

In some embodiments, hybrid model module 120 may be configured to select a representative hybrid deterministic-geostatistical earth model from among the set of final hybrid deterministic-geostatistical earth models. The representative hybrid deterministic-geostatistical earth model may have a range of uncertainties based on one or more of at least one reservoir parameter, geological plausibility, and/or other information, according to some embodiments.

Figure 2:
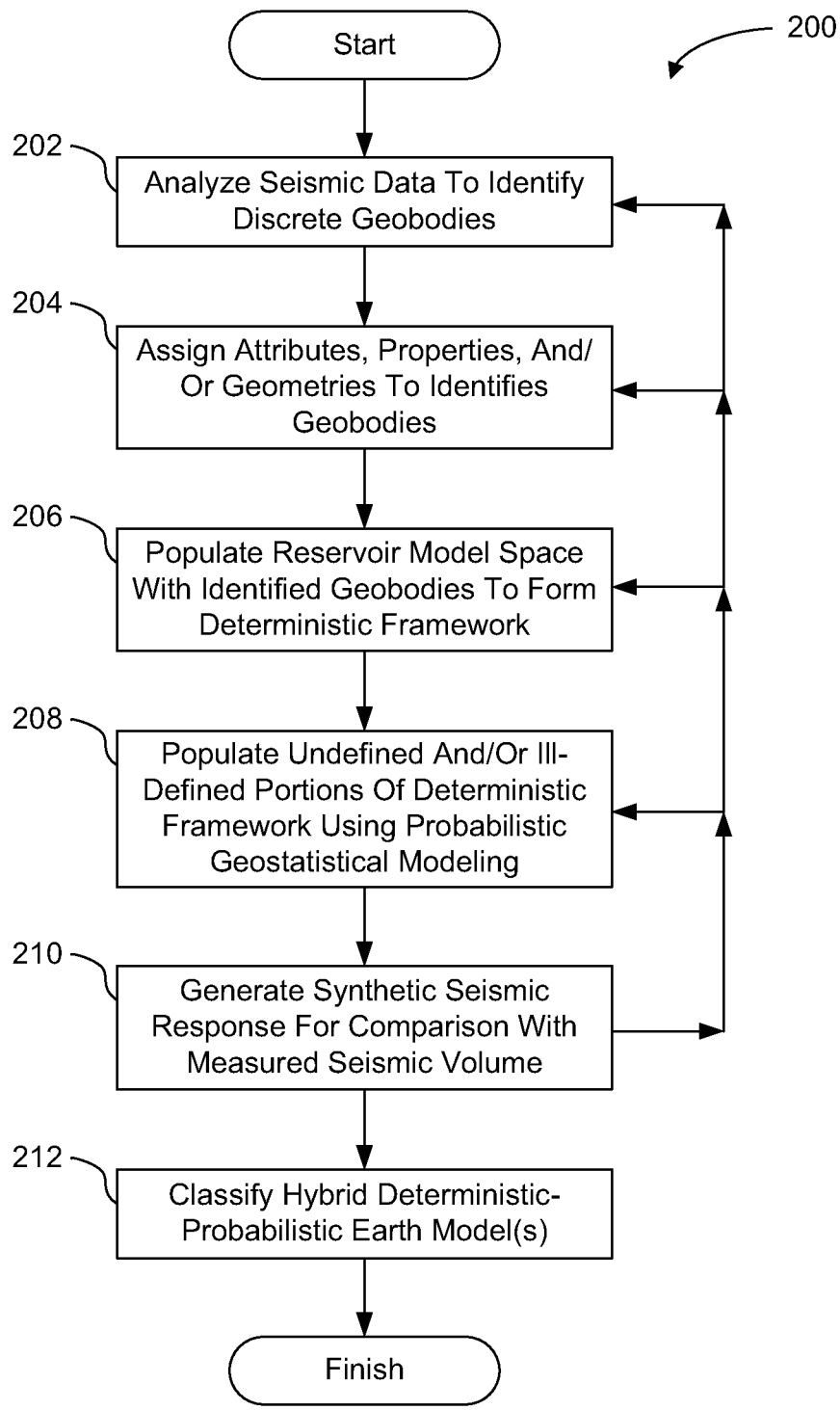
FIG. 2 illustrates a workflow for generating hybrid deterministic-geostatistical earth models, in accordance with one or more embodiments.
Figure 3A:
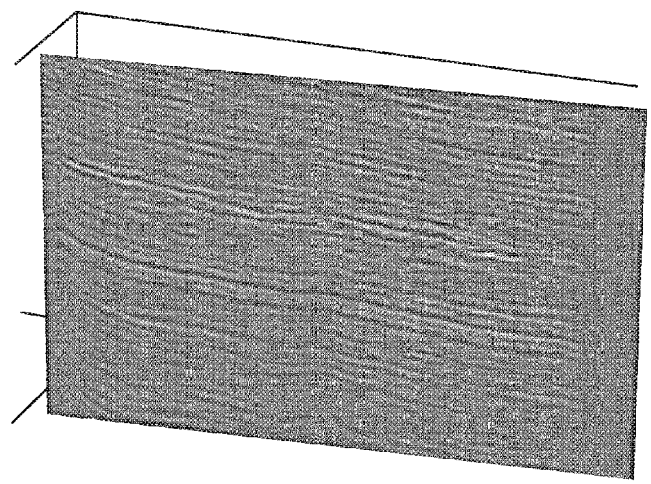
FIGS. 3A-3C provide illustrative information associated with workflow of FIG. 2, in accordance with one or more embodiments.
Figure 3B:
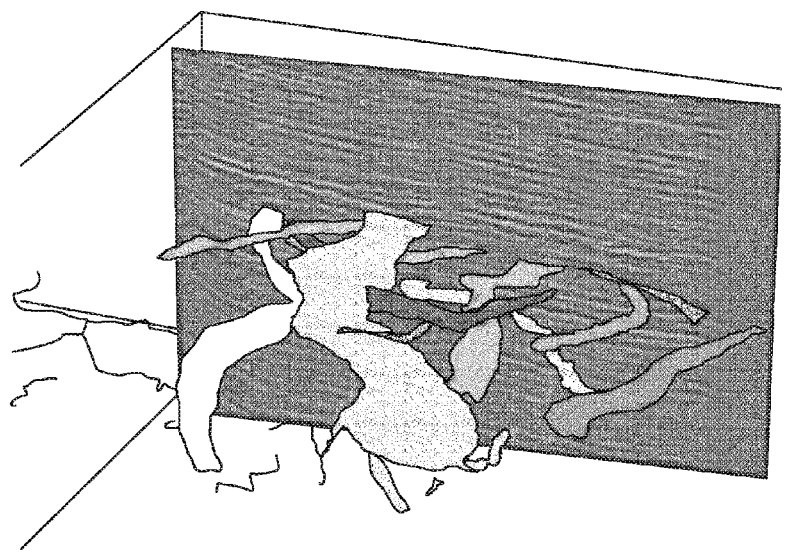
Figure 3C:
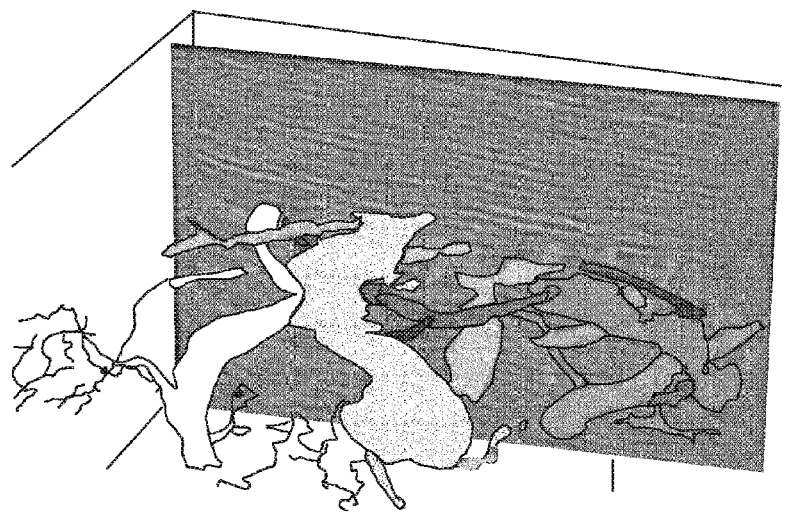

FIG. 2 illustrates a workflow 200 for generating hybrid deterministic-geostatistical earth models, in accordance with one or more embodiments. As depicted in FIG. 2, workflow 200 includes process steps 202, 206, 208, 210, and/or 212. One or more of process steps 202, 206, 208, 210, and/or 212 may be omitted and/or combined with another process step. Additional process steps may be included in workflow 200. The order of process steps 202, 206, 208, 210, and/or 212 shown in FIG. 2 is not intended to be limiting as process steps 202, 206, 208, 210, and/or 212 may be performed in other orders. One or more process steps 202, 206, 208, 210, and/or 212 of workflow 200 may be performed by one or more components of system 100. FIGS. 3A-3C and 4A-4D provide illustrative information associated with workflow 200. More specifically, FIGS. 3A-3C illustrate extraction of geobodies from a seismic volume, while FIGS. 4A-4D illustrate construction of a hybrid deterministic-geostatistical earth model by way of a cross-section through a seismic volume superimposed with the hybrid deterministic-geostatistical earth model, in accordance with one or more embodiments. Additionally, one or more process steps may include methods described in one or both of the '995 application and/or the '094 application, which have both been incorporated herein by reference.

Figure 4A:
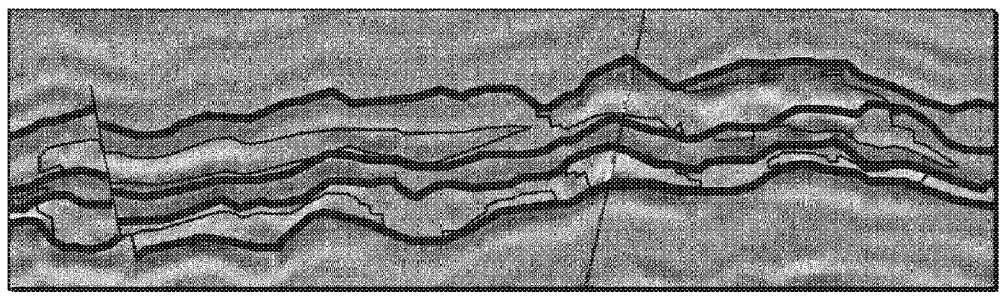
FIGS. 4A-4D provide illustrative information associated with the workflow of FIG. 2, in accordance with one or more embodiments.

At process step 202, seismic data is analyzed to identify one or more discrete geobodies. Such analysis may include one or more seismic-stratigraphic analytical techniques, one or more seismic-geomorphologic analytical techniques, and/or other analysis techniques. FIG. 3A illustrates an exemplary visualization of a seismic data set. The seismic data is analyzed to identify one or more discrete geobodies. The identified geobodies are represented in a framework as geobody representations. FIG. 3B illustrates an exemplary visualization of representations of identified geobodies superimposed on the seismic data set of FIG. 3A. FIG. 4A illustrates another exemplary visualization of representations of identified geobodies superimposed on a seismic data set. According to some embodiments, process step 202 includes examining limited offset/angle stacks. Signal enhancement procedures can be performed as necessary. When identifying discrete geobodies from the seismic data, different geobodies may be imaged within different offset stack domains using animation and/or visualization tools.

Figure 4B:
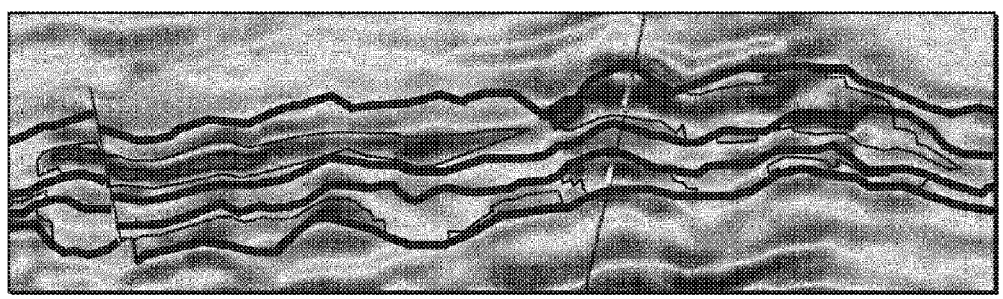

At process step 204, attributes, reservoir properties and/or geometries, geobody properties and/or geometries, and/or other information may be assigned to individual ones and/or groups of identified geobodies. In some embodiments, amplitude offset analysis and/or inversion using seismic and well log information is used to determined spatial dimensions (e.g., thickness) of individual geobodies and/or reservoir properties. Relative confidence metrics may be assigned to individual ones of the identified geobodies. Such confidence metrics can be quantitative and/or qualitative. FIG. 3C illustrates an exemplary visualization of attributes, reservoir properties, and/or other information assigned to the identified geobodies of FIG. 3B. FIG. 4B also illustrates an exemplary visualization of attributes, reservoir properties, and/or other information assigned to the identified geobodies of FIG. 4A.

Figure 4C:
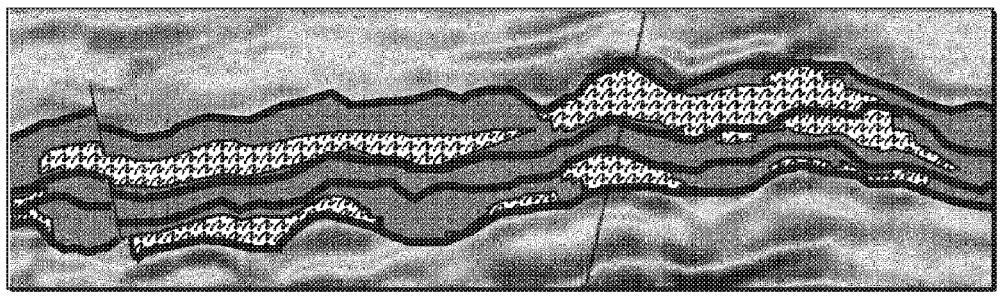

At process step 206, a reservoir model space is populated with identified geobodies to form a deterministic framework. The geobodies will be deterministic components of a hybrid deterministic-geostatistical earth model. A deterministic framework is a matrix associated with the earth model that extends over some or all of the earth model and includes individual ones of the identified one or more geobody representations and one or more undefined regions. Undefined and/or ill-defined portions are discussed further in connection with process step 208. FIG. 4C illustrates an exemplary visualization of identified and aggregated geobodies populating a deterministic framework, where the grey regions indicate regions of the deterministic framework having no well-defined geobodies.

Figure 4D:
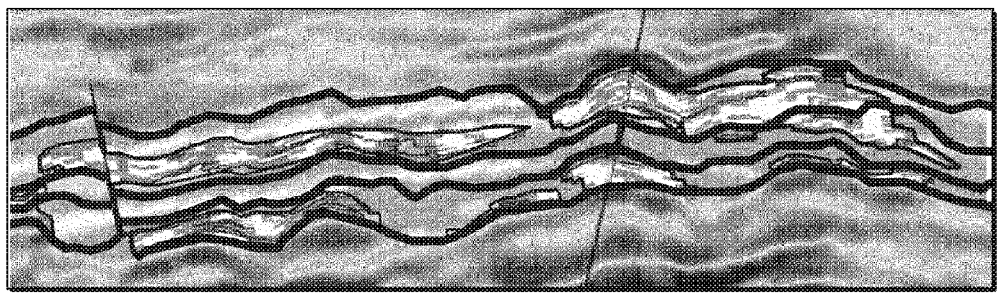

At process step 208, one or more undefined and/or ill-defined portions of the deterministic framework are populated using probabilistic geostatistical modeling to obtain a hybrid deterministic-geostatistical earth model. FIG. 4D illustrates an exemplary illustration of the deterministic framework of FIG. 4C having some or all undefined and/or ill-defined portions populated using probabilistic geostatistical modeling. In some embodiments, well log information is integrated into the deterministic framework through identification of additional smaller-scale geobodies. Some embodiments include in-filling stratigraphic detail within geobodies and/or the deterministic framework. Process step 208 may include facies simulation (e.g., MPS, MPS related techniques, and/or other simulation techniques) to populate spatial context into undefined and/or ill-defined portions of the deterministic framework. This can resolve any remaining ambiguities associated with reservoir properties and/or address a limitation of seismic data to resolve or detect depositional geobodies, which may be evident in well data.

At process step 210, a synthetic seismic response of the hybrid deterministic-geostatistical earth model is generated for comparison with a corresponding measured seismic volume. If a comparison between the associated seismic derived properties does not match the observed seismic response to an acceptable level, one or more actions can be taken to mitigate the disparity. For example, when there are systematic variations (e.g., where there is poor seismic quality), the observed seismic is reworked. As another example, if some or all of the hybrid deterministic-geostatistical earth models show poor comparison with the observed seismic, the deterministic framework is reinterpreted by iteration through step 202. As yet another example, when geostatistical in-fill details appear invalid, geostatistical constraints are re-addressed by iteration through step 208. Generally, when there is significant discrepancy between the synthetic response and the measured seismic volume, one or more of process steps 202, 204, 206, and/or 208 may be revisited. The hybrid deterministic-geostatistical earth model is validated and/or updated using consistency criteria between properties of the hybrid deterministic-geostatistical earth model and seismic data. According to some embodiments, several different hybrid deterministic-geostatistical earth models may be obtained according to workflow 200.

At process step 212, one or more hybrid deterministic-geostatistical earth models are classified to determine acceptable or preferred hybrid deterministic-geostatistical earth models. The classification may be based on one or more reservoir metrics. Such metrics may include static reservoir properties (e.g., oil in place, gas in place, and/or other properties), dynamic reservoir properties (e.g., production rate, estimated ultimate recovery, and other properties), and/or other metrics. These and other metrics can be obtained via reservoir simulation and can be related back to characteristics of the hybrid deterministic-geostatistical earth model(s).

Figure 5:
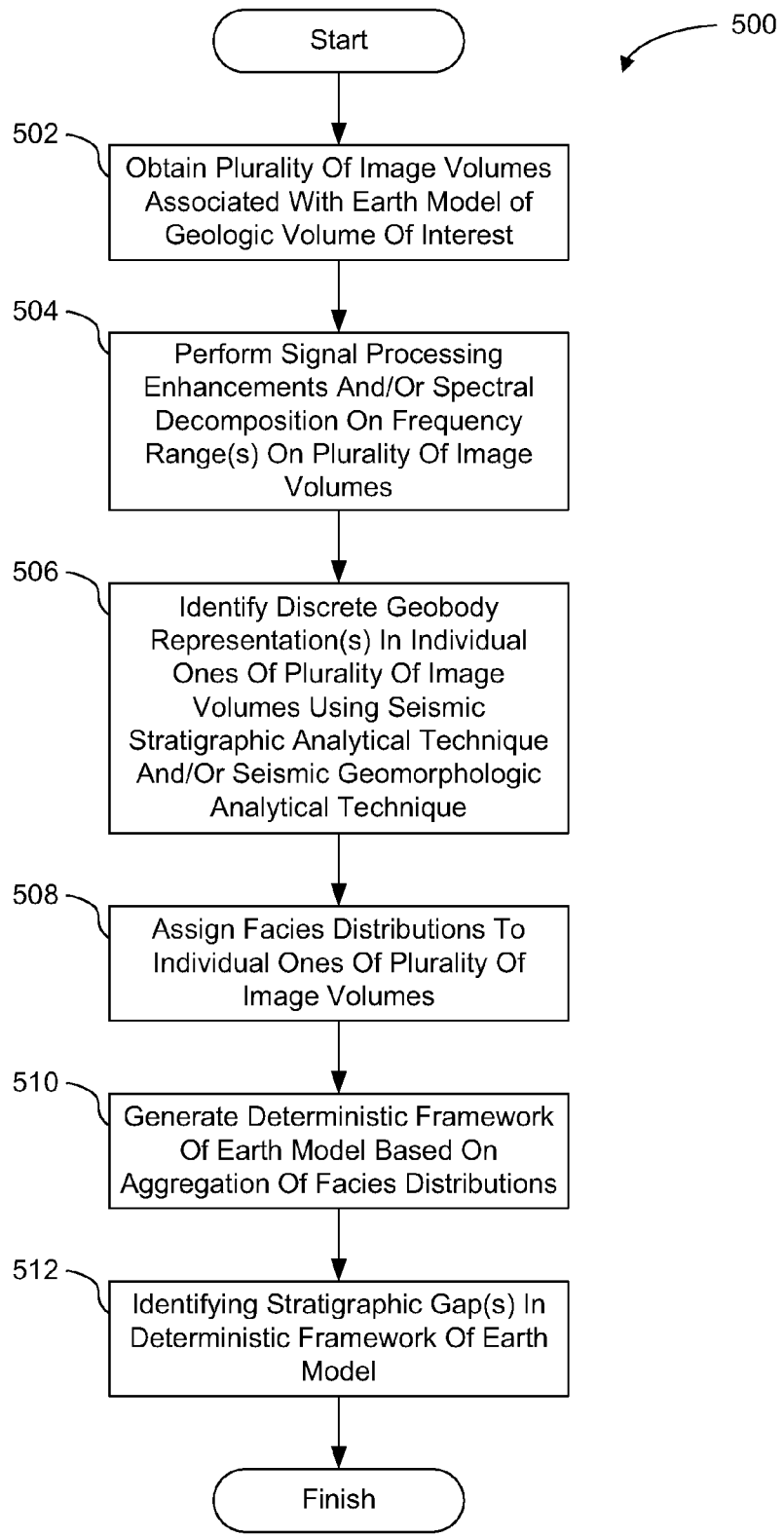
FIG. 5 illustrates a method for generating a deterministic framework for earth models through deterministic identification of discrete geobodies, in accordance with one or more embodiments.

FIG. 5 illustrates a method 500 for generating a deterministic framework for earth models through deterministic identification of discrete geobodies, in accordance with one or more embodiments. The operations of the method 500 presented below are intended to be illustrative. In some embodiments, the method 500 may be accomplished with one or more additional operations not described, and/or without one or more of the operations discussed. For example, the method 500 may include one or more operations described in the '995 application and/or the '094 application, which have both been incorporated herein by reference. Additionally, the order in which the operations of the method 500 are illustrated in FIG. 5 and described below is not intended to be limiting.

In some embodiments, the method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of the method 500 in response to instructions stored electronically on an electronic storage medium. The one or more processing devices may include one or more devices configured through hardware, firmware, and/or software to be specifically designed for execution of one or more of the operations of the method 500.

At operation 502, a plurality of image volumes associated with an earth model of a geologic volume of interest that includes one or more geobodies is obtained. In some embodiments, operation 502 may be performed by image volume module 112.

At operation 504, one or both of signal processing enhancements or spectral decomposition are performed on one or more frequency ranges on the plurality of image volumes associated with the earth model of the geologic volume of interest. In some embodiments, operation 504 may be performed by image volume module 112.

At operation 506, one or more discrete geobody representations are identified in individual ones of the plurality of image volumes by analyzing one or more of the plurality of image volumes using one or both of a seismic stratigraphic analytical technique or a seismic geomorphologic analytical technique. In some embodiments, operation 506 may be performed by geobody module 114.

At operation 508, facies distributions are assigned to individual ones of the plurality of image volumes. In some embodiments, operation 508 may be performed by facies assignment module 116.

At operation 510, a deterministic framework of the earth model is generated based on an aggregation of the facies distributions. In some embodiments, operation 510 may be performed by framework module 118.

At operation 512, one or more stratigraphic gaps in the deterministic framework of the earth model are identified. In some embodiments, operation 512 may be performed by framework module 118.

Figure 6:
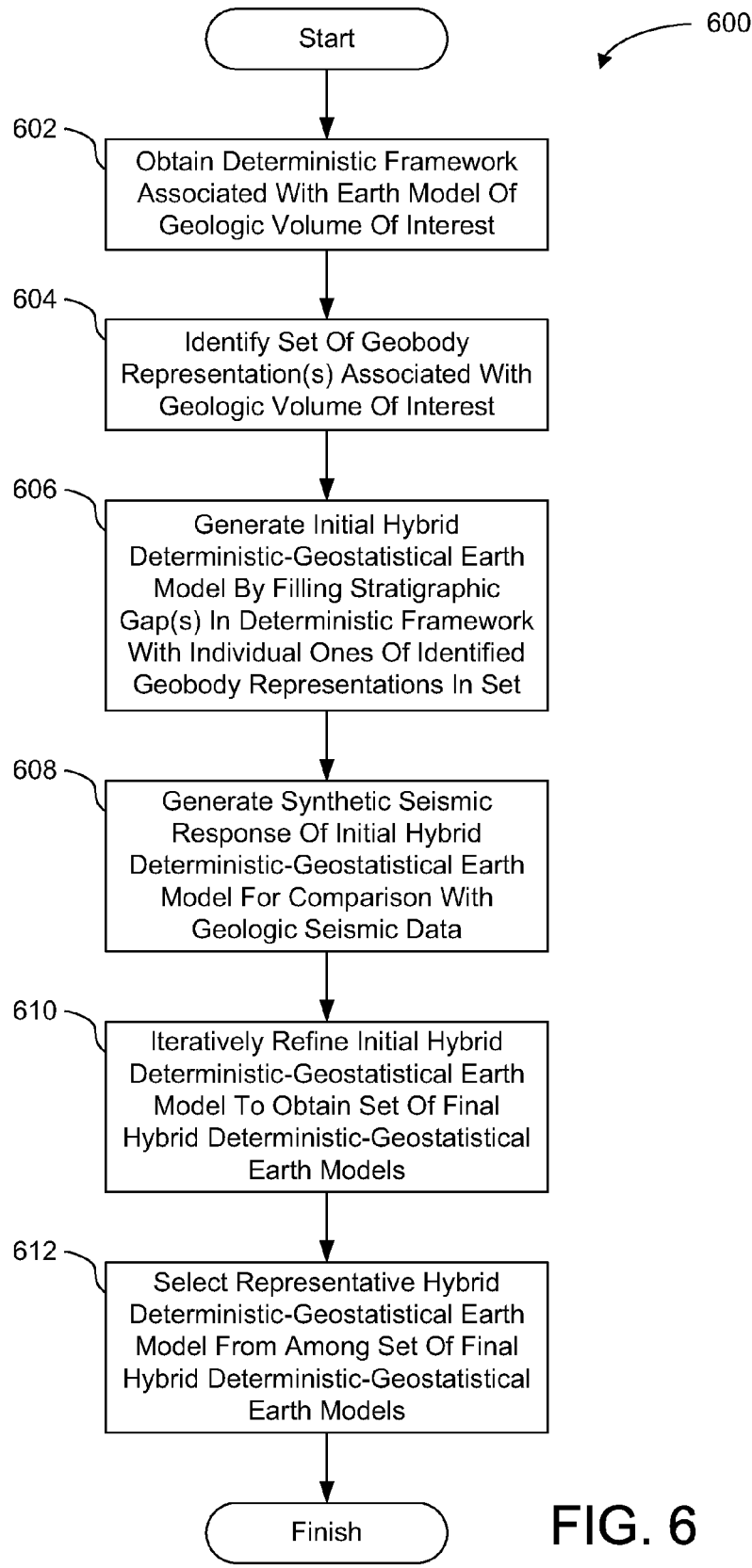
FIG. 6 illustrates a method for generating hybrid deterministic-geostatistical earth models by filling stratigraphic gaps in deterministic frameworks using geostatistical information and/or seismic inversion, in accordance with one or more embodiments.

FIG. 6 illustrates a method for generating hybrid deterministic-geostatistical earth models by filling stratigraphic gaps in deterministic frameworks using geostatistical information and/or seismic inversion, in accordance with one or more embodiments. The operations of the method 600 presented below are intended to be illustrative. In some embodiments, the method 600 may be accomplished with one or more additional operations not described, and/or without one or more of the operations discussed. For example, the method 600 may include one or more operations described in the '995 application and/or the '094 application, which have both been incorporated herein by reference. Additionally, the order in which the operations of the method 600 are illustrated in FIG. 6 and described below is not intended to be limiting.

In some embodiments, the method 600 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of the method 600 in response to instructions stored electronically on an electronic storage medium. The one or more processing devices may include one or more devices configured through hardware, firmware, and/or software to be specifically designed for execution of one or more of the operations of the method 600.

At operation 602, a deterministic framework associated with an earth model of a geologic volume of interest that includes one or more geobodies is obtained. In some embodiments, operation 602 may be performed by framework module 118.

At operation 604, a set of one or more geobody representations associated with the geologic volume of interest is identified. In some embodiments, operation 604 is performed by geobody module 114.

At operation 606, an initial hybrid deterministic-geostatistical earth model is generated by filling one or more stratigraphic gaps in the deterministic framework of the earth model with individual ones of the geobody representations in the set. In some embodiments, operation 606 is performed by hybrid model module 120.

At operation 608, a synthetic seismic response of the initial hybrid deterministic-geostatistical earth model is generated for comparison with the measured seismic data. In some embodiments, operation 608 is performed by synthetic seismic response module 122.

At operation 610, the initial hybrid deterministic-geostatistical earth model is iteratively refined to obtain a set of final hybrid deterministic-geostatistical earth models. In some embodiments, operation 610 is performed by hybrid model module 120.

At operation 612, a representative hybrid deterministic-geostatistical earth model is selected from among the set of final hybrid deterministic-geostatistical earth models. In some embodiments, operation 612 is performed by hybrid model module 120.

Although the technology has been described in detail for the purpose of illustration based on what is currently considered to be the most practical and preferred embodiments, it is to be understood that such detail is solely for that purpose and that the technology is not limited to the disclosed embodiments, but, on the contrary, is intended to cover modifications and equivalent arrangements that are within the spirit and scope of the appended claims. For example, it is to be understood that the present technology contemplates that, to the extent possible, one or more features of any embodiment can be combined with one or more features of any other embodiment.

What is claimed is:

1. A computer-implemented method for generating a hybrid deterministic-geostatistical framework for earth models, the method comprising:

obtaining a plurality of image volumes associated with an earth model of a geologic volume of interest that includes one or more geobodies, the earth model being based on seismic data representing energy that has propagated through the geologic volume of interest from one or more energy sources to one or more energy receivers, the seismic data including one or more of at least one offset stack, at least one angle stack, or at least one azimuth stack, individual ones of the plurality of image volumes corresponding to different stack domains;

performing one or both of signal processing enhancements or spectral decomposition on one or more frequency ranges on the plurality of image volumes associated with the earth model of the geologic volume of interest;

identifying one or more discrete geobody representations in individual ones of the plurality of image volumes by analyzing one or more of the plurality of image volumes using one or both of a seismic stratigraphic analytical technique or a seismic geomorphologic analytical technique, individual ones of the one or more geobody representations corresponding to the one or more geobodies included in the geologic volume of interest;

assigning facies distributions to individual ones of the plurality of image volumes, the facies distributions including spatially descriptive values and/or rock properties assigned to the identified one or more geobody representations based on one or both of borehole data and/or geophysical modeling;

generating a deterministic framework of the earth model based on an aggregation of the facies distributions, the deterministic framework being a matrix associated with the earth model that extends over some or all of the earth model and includes individual ones of the identified one or more geobody representations and one or more undefined regions;

identifying one or more stratigraphic gaps in the deterministic framework of the earth model, the one or more stratigraphic gaps being devoid of identified geobody representations; and filling the identified one or more stratigraphic gaps in the deterministic framework of the earth model with individual ones of the identified geobody representations.

2. The method of claim 1, wherein identifying the one or more discrete geobody representations includes identifying one or more stratigraphic patterns in a given image volume from an animation comprising a succession of frames derived from the given image volume, an individual frame including a single slice through the given image volume or an optical stack volume associated with the given image volume.

3. The method of claim 2, wherein identifying the one or more stratigraphic patterns in the given image volume includes interpreting the given image volume based on analysis of slices through the given image volume or optical stack volumes associated with the given image volume.

4. The method of claim 2, wherein identifying the one or more stratigraphic patterns from the animation includes identifying changes between successive frames of the animation.

5. The method of claim 4, wherein the changes between the successive frames of the animation include geobodies having different rates of movement between the successive frames.

6. The method of claim 2, wherein the optical stack volume includes two or more slices through the given image volume.

7. The method of claim 6, wherein the opacity of the two or more of the slices of the optical stack volume is adjusted such that geobodies breach an opacity threshold.

8. The method of claim 2, further comprising canceling out noise-related patterns by filtering one or more of individual ones of the plurality of image volumes, slices through individual ones of the plurality of image volumes, or optical stack volumes associated with individual ones of the plurality of image volumes.

9. The method of claim 1, further comprising assigning an interpretation confidence level to individual ones of the identified one or more geobody representations, wherein an interpretation confidence level for a given geobody representation being indicative of confidence in spatially descriptive values and/or rock properties associated with the given geobody representation.

10. The method of claim 1, further comprising determining the spatially descriptive values via reservoir property estimation from seismic analysis.

11. The method of claim 1, wherein the spatially descriptive values include one or both of a vertical thickness value or a lateral dimension value.

12. The method of claim 1, wherein the one or more geobodies include one or more of a stratigraphic horizon, a reservoir surface, a geological surface, a fluvial channel, a delta, a deltaic fan, a submarine fan, a reef, a sandbar, a point bar, a fault, an unconformity, a dike, a sill, a salt body, a crevasse splay, a reservoir flow unit, a fluid contact, a turbidite channel, or a turbidite sheet.

13. The method of claim 1, wherein the rock properties comprise one or more of velocity, porosity, permeability, homogeneity, anisotropy, density, acoustic properties, elastic properties, petrophysical properties, fluid properties, reservoir properties, geologic description, or lithologic classification.

14. A computer-implemented method for generating hybrid deterministic-geostatistical earth models by filling stratigraphic gaps in deterministic frameworks using geostatistical information and/or seismic inversion, the method comprising:

obtaining a deterministic framework associated with an earth model of a geologic volume of interest that includes one or more geobodies, the earth model being based on measured seismic data representing energy that has propagated through the geologic volume of interest from one or more energy sources to one or more energy receivers, the measured seismic data including one or more of at least one offset stack, at least one angle stack, or at least one azimuth stack, the deterministic framework being a matrix associated with the earth model that extends over some or all of the earth model;

identifying a set of one or more geobody representations associated with the geologic volume of interest, individual ones of the geobody representations in the set being stochastically derived and representing individual ones of the one or more geobodies included in the geologic volume of interest, the set of one or more geobody representations being constructed based on geostatistical methodology using one or both of borehole data or interpreted dynamic production data;

generating an initial hybrid deterministic-geostatistical earth model by filling one or more stratigraphic gaps in the deterministic framework of the earth model with individual ones of the geobody representations in the set, individual ones of the one or more stratigraphic gaps being regions of the deterministic framework that are devoid of geobody representations;

generating a synthetic seismic response of the initial hybrid deterministic-geostatistical earth model for comparison with the measured seismic data, the comparison facilitating validation of the initial hybrid deterministic-geostatistical earth model;

iteratively refining the initial hybrid deterministic-geostatistical earth model to obtain a set of final hybrid deterministic-geostatistical earth models, the refining being based on successive comparisons between the geologic seismic response and synthetic seismic responses of refined hybrid deterministic-geostatistical earth models, wherein a synthetic seismic response of individual ones of the set of final hybrid deterministic-geostatistical earth model approximates the measured seismic data; and selecting a representative hybrid deterministic-geostatistical earth model from among the set of final hybrid deterministic-geostatistical earth models, the representative hybrid deterministic-geostatistical earth model having a range of uncertainties based on one or more of at least one reservoir parameter or geological plausibility.

15. The method of claim 14, further comprising identifying the stratigraphic gaps in the deterministic framework by determining individual regions of the deterministic framework that are devoid of geobody representations.

16. The method of claim 14, wherein filling at least one of the one or more stratigraphic gaps in the deterministic framework is based on a multi-point statistical workflow.

17. The method of claim 14, further comprising assigning an interpretation confidence level to individual ones of the identified set of one or more geobody representations, wherein an interpretation confidence level for a given geobody representation being indicative of confidence in spatially descriptive values and/or rock properties associated with the given geobody representation.

18. The method of claim 14, wherein the one or more geobodies include one or more of a stratigraphic horizon, a reservoir surface, a geological surface, a fluvial channel, a delta, a deltaic fan, a submarine fan, a reef, a sandbar, a point bar, a fault, an unconformity, a dike, a sill, a salt body, a crevasse splay, a reservoir flow unit, a fluid contact, a turbidite channel, or a turbidite sheet.

19. The method of claim 14, wherein generating the initial hybrid deterministic-geostatistical earth model includes assigning one or both of spatially descriptive values or rock properties to individual ones of the geobody representations included in the hybrid deterministic-geostatistical earth model based on one or both of borehole data or geophysical modeling.

20. The method of claim 19, wherein the rock properties comprise one or more of velocity, porosity, permeability, homogeneity, anisotropy, density, acoustic properties, elastic properties, petrophysical properties, fluid properties, reservoir properties, geologic description, or lithologic classification.

21. The method of claim 19, further comprising determining the spatially descriptive values via reservoir property estimation from seismic analysis.

22. The method of claim 19, wherein the spatially descriptive values include one or both of a vertical thickness value or a lateral dimension value.

23. A system configured to generate a deterministic framework for earth models and to generate hybrid deterministic-geostatistical earth models, the system comprising:

one or more processors configured to execute computer program modules, the computer program modules comprising:

an image volume module configured to generate or obtain a plurality of image volumes associated with an earth model of a geologic volume of interest that includes one or more geobodies, the earth model being based on seismic data representing energy that has propagated through the geologic volume of interest from one or more energy sources to one or more energy receivers, the seismic data including one or more of at least one offset stack, at least one angle stack, or at least one azimuth stack, individual ones of the plurality of image volumes corresponding to different stack domains;

a geobody module configured to identify one or more discrete geobody representations in individual ones of the plurality of image volumes by analyzing one or more of the plurality of image volumes using one or both of a seismic stratigraphic analytical technique or a seismic geomorphologic analytical technique, individual ones of the one or more geobody representations corresponding to the one or more geobodies included in the geologic volume of interest;

a facies assignment module configured to assign facies distributions to individual ones of the plurality of image volumes, the facies distributions including spatially descriptive values and/or rock properties assigned to the identified one or more geobody representations based on one or both of borehole data and/or geophysical modeling;

a framework module configured to generate or obtain a deterministic framework of the earth model based on an aggregation of the facies distributions, the deterministic framework being a matrix associated with the earth model that extends over some or all of the earth model and including individual ones of the identified one or more geobody representations and one or more stratigraphic gaps, individual ones of the one or more stratigraphic gaps being regions of the deterministic framework that are devoid of geobody representations;

a hybrid model module configured to generate or obtain a hybrid deterministic-geostatistical earth model by filling individual ones of the one or more stratigraphic gaps in the deterministic framework with individual ones of a set of one or more geobody representations associated with the geologic volume of interest, individual ones of the geobody representations in the set being stochastically derived and representing individual ones of the one or more geobodies included in the geologic volume of interest, the set of one or more geobody representations being constructed based on geostatistical methodology using one or both of borehole data or interpreted dynamic production data; and a synthetic seismic response module configured to generate or obtain a synthetic seismic response of the hybrid deterministic-geostatistical earth model for comparison with the seismic data to validate the hybrid deterministic-geostatistical earth model.

24. A non-transitory computer-readable storage medium having instructions embodied thereon, the instructions being executable by a processor to perform a method for generating a hybrid deterministic-geostatistical framework for earth models, the method comprising:

obtaining a plurality of image volumes associated with an earth model of a geologic volume of interest that includes one or more geobodies, the earth model being based on seismic data representing energy that has propagated through the geologic volume of interest from one or more energy sources to one or more energy receivers, the seismic data including one or more of at least one offset stack, at least one angle stack, or at least one azimuth stack, individual ones of the plurality of image volumes corresponding to different stack domains;

performing one or both of signal processing enhancements or spectral decomposition on one or more frequency ranges on the plurality of image volumes associated with the earth model of the geologic volume of interest;

identifying one or more discrete geobody representations in individual ones of the plurality of image volumes by analyzing one or more of the plurality of image volumes using one or both of a seismic stratigraphic analytical technique or a seismic geomorphologic analytical technique, individual ones of the one or more geobody representations corresponding to the one or more geobodies included in the geologic volume of interest;

assigning facies distributions to individual ones of the plurality of image volumes, the facies distributions including spatially descriptive values and/or rock properties assigned to the identified one or more geobody representations based on one or both of borehole data and/or geophysical modeling;

generating a deterministic framework of the earth model based on an aggregation of the facies distributions, the deterministic framework being a matrix associated with the earth model that extends over some or all of the earth model and includes individual ones of the identified one or more geobody representations and one or more undefined regions;

identifying one or more stratigraphic gaps in the deterministic framework of the earth model, the one or more stratigraphic gaps being devoid of identified geobody representations; and filling the identified one or more stratigraphic gaps in the deterministic framework of the earth model with individual one of the identified geobody representations.

25. A non-transitory computer-readable storage medium having instructions embodied thereon, the instructions being executable by a processor to perform a method for generating hybrid deterministic-geostatistical earth models by filling stratigraphic gaps in deterministic frameworks using geostatistical information and/or seismic inversion, the method comprising:

obtaining a deterministic framework associated with an earth model of a geologic volume of interest that includes one or more geobodies, the earth model being based on measured seismic data representing energy that has propagated through the geologic volume of interest from one or more energy sources to one or more energy receivers, the measured seismic data including one or more of at least one offset stack, at least one angle stack, or at least one azimuth stack, the deterministic framework being a matrix associated with the earth model that extends over some or all of the earth model;

identifying a set of one or more geobody representations associated with the geologic volume of interest, individual ones of the geobody representations in the set being stochastically derived and representing individual ones of the one or more geobodies included in the geologic volume of interest, the set of one or more geobody representations being constructed based on geostatistical methodology using one or both of borehole data or interpreted dynamic production data;

generating an initial hybrid deterministic-geostatistical earth model by filling one or more stratigraphic gaps in the deterministic framework of the earth model with individual ones of the geobody representations in the set, individual ones of the one or more stratigraphic gaps being regions of the deterministic framework that are devoid of geobody representations;

generating a synthetic seismic response of the initial hybrid deterministic-geostatistical earth model for comparison with the measured seismic data, the comparison facilitating validation of the initial hybrid deterministic-geostatistical earth model;

iteratively refining the initial hybrid deterministic-geostatistical earth model to obtain a set of final hybrid deterministic-geostatistical earth models, the refining being based on successive comparisons between the geologic seismic response and synthetic seismic responses of refined hybrid deterministic-geostatistical earth models, wherein a synthetic seismic response of the final hybrid deterministic-geostatistical earth model approximates the measured seismic data; and selecting a representative hybrid deterministic-geostatistical earth model from among the set of final hybrid deterministic-geostatistical earth models, the representative hybrid deterministic-geostatistical earth model having a range of uncertainties based on one or more of at least one reservoir parameter or geological plausibility.

\* \* \* \* \*

UNITED STATES PATENT AND TRADEMARK OFFICE
CERTIFICATE OF CORRECTION

PATENT NO. : 8,843,353 B2  Page 1 of 1
APPLICATION NO. : 13/217810
DATED : September 23, 2014
INVENTOR(S) : Posamentier et al.

It is certified that error appears in the above-identified patent and that said Letters Patent is hereby corrected as shown below:

Title Page, Item (75) Inventors should read

-- (75) Inventors: Henry W. Posamentier, The Woodlands, TX (US); Cung Khac Vu, Houston, TX (US); James P. DiSiena, Houston, TX (US); Todd Dygert, Kingwood, TX (US); Julio De La Colina, Houston, TX (US) --.

Signed and Sealed this
First Day of March, 2016

Michelle K. Lee
*Director of the United States Patent and Trademark Office*